Patented June 3, 1952

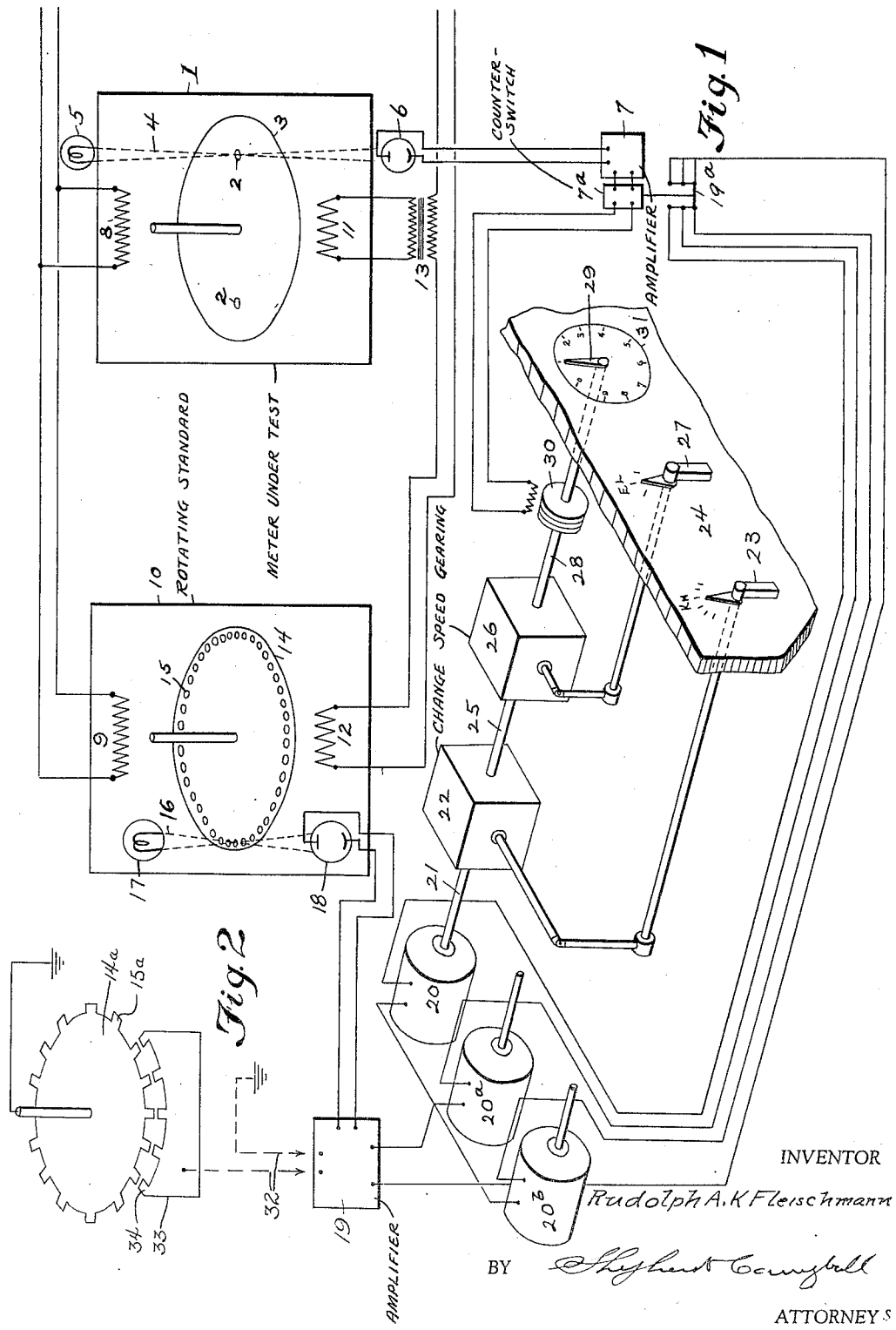

2,599,378

UNITED STATES PATENT OFFICE 2,599,378

MEANS FOR TESTING WATT-HOUR METERS

Rudolf A. K. Fleischmann, Philadelphia, Pa.

Application August 18, 1949, Serial No. 110,997

7 Claims. (Cl. 175—183)

This invention relates to a method of and means for testing watthour meters. The primary object of the invention is to provide simple and accurate means for not only comparing a meter to be tested with a rotating standard test meter but also to provide means for compensating for the varying $K_H$ values or test constants inherent in the makes of watthour meters put out by different manufacturers.

The invention also contemplates the provision of means for testing the separate elements of polyphase meters while also compensating for variations in the test constants of the meters under test.

By the use of additional synchronous motors driven under control of the same rotating standard additional indicators may be actuated to show the results of the full load, lagging power factor and light load tests of meters being tested. Thus by mounting these various indicators or pointers on a common support such as a vertical panel there is brought before the eyes, in convenient and easily read position the results of a multiplicity of tests made under conditions requiring the use of only one rotating standard. The very great reduction in cost of the necessary equipment will be readily appreciated.

The advantages of the invention will be best understood by first considering the methods now in use and the limitations and deficiencies inherent therein.

In production testing of large numbers of meters in the shop, it is conventional practice to provide means for supporting the meter under test on a suitable panel fitted with current and voltage controls. A reference test meter or rotating standard is connected electrically to the meter under test so that potential elements are in parallel and current elements in series. Both instruments then operate under identical conditions of voltage and current.

The test consists of comparing the number of revolutions and fractions thereof made by the rotating standard during the time that the meter under test has made an arbitrary whole number of revolutions. The discrepancy is then a guide to the degree of adjustment to be made to the meter under test.

All rotating standards, or portable test meters, are built along the same general principles as all watthour meters, in that the moving element is an aluminum disc fastened to a vertical spindle, the lower end of said spindle riding on a jewel bearing. Due to the necessity of keeping friction to a minimum, it has been found that a vertical spindle mounting is, to date, the only practical arrangement.

This restriction introduces a difficulty in the matter of locating the rotating standard so that the horizontal dial shall always be easily visible. In most cases, the bench or table on which all the testing facilities are mounted is usually large enough so that there is room for setting the rotating standard on the table top alongside other equipment. In other cases, it has been found desirable to set the standard into a recess or well in the table, so that the dial is flush with the table top. This eliminates the interference caused by the relatively large bulk of the rotating standard.

The present day tendency is to centralize all controls and instruments as much as possible and reduce the size of the testing equipment. To this end it has been proposed to construct a meter test board in which the rotating standard is installed behind the control panel entirely, thus removing all obstructions from the working surface of the bench top. The image of the rotating standard dial, reflected from a mirror set at 45°, is then observed thru an opening or window in the face of the panel.

The ideal condition, however, would be one in which the dial itself can be flush-mounted in the vertical face of a panel at eye level. This could be done if it were possible to design a rotating standard to operate with its spindle in a horizontal position. Friction problems, however, make this impossible.

In addition, there are other considerations which make the direct use of a rotating standard an inconvenience, even though certain drawbacks are at present tolerated simply because no satisfactory solution has yet been found.

The various problems in connection with the use of rotating standards can be summarized in the following manner:

1. Visibility of the pointer and dial.
2. Capital investment of multiple units.
3. $K_H$ values.
4. Sub-multiple polyphase speeds.

In certain high speed automatic testing, it has bee nproposed to show the results of the full load, lagging power factor, and light load tests on three separate standards. This involves an investment of a very considerable sum. By the mechanism hereinafter described the mechanism for making a plurality of tests under control of one standard can be made at a much lower cost.

Various makes and types of watthour meters have different basic $K_H$ values. The term $K_H$ refers to the test constant, which is the watthour per disc revolution. It is desirable to have the speed of the rotating standard equal to the speed of the meter under test, to simplify the error calculation. In particular, if the standard makes 10.1 revolutions while the meter makes 10 revolutions, then the meter is running at $$\frac{10}{10.1}$$

or 99% of its rated speed and an adjustment is indicated. The dial of the conventional rotating standard is divided into 100 divisions, and in 10 revolutions each division corresponds to an error of 1 part in 1000 or 0.1%. The magnitude of the error, to the nearest 0.1% can be read off directly on the standard dial. A simple addition or subtraction, for errors not exceeding 4%, is for most purposes as precise as the theoretically necessary division. In any event, the determination of the meter error is always a relatively simple problem when the nominal number of rotating standard revolutions can be made equal to 10.

The following table gives the test constant or $K_H$, and the corresponding full load speed of the various watthour meters made by different manufacturers and now in use:

Table I

| $K_H$ | R. P. M. |
|---|---|
| 5/4 | 48 |
| 3/2 | 40 |
| 9/5 | 33⅓ |
| 2 | 30 |
| 3 | 20 |
| 18/5 | 16⅔ |

Every rotating standard is in itself a specially constructed watthour meter and will have one of the above values of $K_H$. This means, obviously, that meter and standard will have the same nominal speed only if both have the same $K_H$ value. Since most power companies use meters having various $K_H$ values, the desired ideal of obtaining 10 revolutions of the rotating standard for 10 revolutions of the meter will seldom be realized with conventional equipment.

What usually happens is that for 10 revolutions of the meter under test, the corresponding nominal revolutions of the rotating standard may be greater or less than 10. The following table gives the various possible number of standard revolutions, when meter and standard have different basic $K_H$ values:

Table II

| | | |
|---|---|---|
| 3.47 | 8.33 | 16.00 |
| 4.17 | 9.00 | 16.66 |
| 5.00 | 11.11 | 18.00 |
| 5.55 | 12.00 | 20.00 |
| 6.25 | 13.33 | 24.00 |
| 6.94 | 14.40 | 28.80 |
| 7.50 | 15.00 | |

In such cases the percent registration of the meter is then the nominal revolutions of the rotating standard divided by the actual revolutions. Where such odd decimal values are involved, the operator must either use a slide rule or else refer to special calibration scales or tables. This means that an additional calculating or reference operation is required which is not necessary in the ideal case of 10 revolutions.

It is proposed, through the mechanism described, to devise a remote indicating rotating standard which shall always make 10 revolutions to correspond to the 10 revolutions of the meter under test.

In testing polyphase meters, the speed of the meter will have one of the values shown in Table I only if all of the meter elements are energized. When testing each element individually, the speed of the meter is reduced in proportion to the number of elements. Thus, one element of a 2 element meter, when operating alone, will run the meter at ½ normal speed. Similarly, one element of a 3 element meter will run the meter at ⅓ normal speed.

This means that an ideal rotating standard should be able to reduce its speed to a submultiple of ½ or ⅓ of its normal speed so as to match the speed of the meter under test in order that the 10 revolution basis can be maintained. This change in speed is accomplished, in the proposed device hereinafter described, by change speed gearing similar to the $K_H$ speed adjustment.

Figure 1 shown in the drawing is a diagrammatic view of one embodiment of the apparatus of my invention. The meter under test 1 is mounted so that the anti-creep holes 2 in disc 3 are in the path of a light beam 4 which originates from lamp 5. Said beam illuminates photoelectric cell 6 whenever a hole crosses the beam. A corresponding electrical impulse is then picked up by vacuum tube amplifier 7 so that two impulses are received for each revolution of the meter under test, this being a consequence of the fact that conventional meter discs 3 contain two such anti-creep holes 2.

The potential coil 8 of meter 1 is connected in parallel with the potential coil 9 of the rotating standard or test meter 10. The current coil 11 of meter 1 is connected in series with the current coil 12 of standard 10, either directly or through the medium of a current transformer 13.

The disc 14 of standard 10 is perforated around its periphery with equally spaced slots or holes 15 which periodically interrupt light beam 16 which originates from lamp 17. Photoelectric cell 18 thereby receives a series of light flashes which occur at a frequency proportional to the speed of disc 14. Said flashes are converted into electrical impulses which are converted by vacuum tube amplifier 19 into alternating current of the same frequency as the light flashes. Said alternating current then operates synchronous electric motor 20 at a speed proportional to the speed of disc 14. Motor 20 is of the geared down type, the speed reduction being so chosen that the speed of output shaft 21 is then exactly equal to the speed of disc 14.

It will be seen that there is no mechanical load whatsoever on disc 14. The actual power to drive motor 20 comes from the power line through the medium of elements 17, 18 and 19. The standard 10 merely controls the speed of the motor 20.

It is characteristic of synchronous motors that their speed is always exactly proportional to the frequency of the source of electric current, and is completely unaffected by variations in the load on the motor, within the load limit. This means, consequently that motor 20 can be loaded down with a variety of gears, clutches and other well-known mechanical devices without any reduction in speed.

Shown in Figure 1 is a gear box 22 with a control handle 23 conveniently mounted on the face of the control panel 24. Gear box 22 is constructed in a conventional manner similar to an automobile transmission in miniature. If the nominal speed of disc 14, and consequently shaft 21 is 30 R. P. M. corresponding to a meter with a basic $K_H$ value of 1/3, then output shaft 25 can be made to have any of the speeds shown in Table I by manipulation of handle 23 to compensate for varying $K_H$ values of the meters under test.

In a similar manner, gear box 26, controlled by handle or shift lever 27, will make the speed of output shaft 28 either equal to the speed of shaft 25, or else ½ or ⅓ the speed of shaft 25 for polyphase meter testing.

In any event, the device shown in Figure 1 makes it possible to have the final output speed of shaft 28 exactly equal to the nominal speed of disc 3 of the meter under test.

Pointer 29 is coupled to shaft 28 through electrically operated clutch 30. Located adjacent amplifier unit 7 is an impulse counting device 7a which will engage electric clutch 30 and cause pointer 29 to move around scale 31 at the instant a given hole 2 interrupts light beam 4 at the beginning of a test run. Impulse counting devices which affect an electric circuit after a given number of impulses have long been used in this art and one such device is shown in General Electric Catalog GEH 1240A. At the end of 20 impulses (or 10 revolutions of meter 1) said counting device disengages clutch 30 and pointer 29 comes to a stop.

The per cent registration of the meter under test can then be interpreted directly from dial 31.

The parts so far described cause the pointer to have the capability of indicating the results of tests upon single phase meters and the elements of polyphase meters and they complementally constitute what may be considered a unit. By using a plurality of such units each comprising a synchronous motor, all of which motors are under control of the single rotating standard, it is possible to actuate indicators to show the result of full load, lagging power factor and light load tests and all of the pointers or indicators indicative of such tests may be mounted upon a common panel to be easily visible. To indicate how such additional units may be easily and simply brought into the assembly, I have indicated at 20a and 20b additional synchronous motors any of which by simple switches may be brought into connection with the output side of the amplifier 19. As many additional units may be provided as there are additional tests to be carried out, the gearing in each unit being designed to fit the conditions of the respective tests. A three way switch is indicated at 19a. This switch may be manually actuated or it may be automatically actuated from the counter 7a. If manually actuated the respective motors may be started or stopped at will to relieve load on the output of amplifier 19, when such motors are not needed.

When automatically actuated its contact making bar 19a may be moved under the influence of the conventional counter controlled switch 7a, previously described, the parts being so set that a given motor 20, 20a or 20b starts enough ahead of its associated clutch 30 to permit the motor to get up to normal speed. However, the switch 19a may be dispensed with altogether and all motors be permitted to run continuously.

Counters of this type are well-known in the meter testing art. Since the usual way of testing meters is to compare the indications from a rotating standard with the meter under test after the latter has made exactly ten revolutions it has long been the practice to provide elements corresponding to 5, 6, 7 and 7a to not only count the ten revolutions of meter 1 but to control the application of line voltage to the potential coil of a rotating standard 10 so that said standard will rotate only during the time interval required by meter 1 to complete exactly ten revolutions. This capability of element 7 to count and control an electric circuit is utilized to control electric clutch 30 and it may be extended to cause it to successively but not simultaneously close the contacts of switch 19a and to thereby automatically set in operation additional testing cycles through the several synchronous motors.

While I have stated that the element 10 may be a conventional rotating standard I may, for reasons of economy substitute a conventional single phase, watt hour meter, therefor. Further while it is possible, as described, to cause one unit such as 10 (whether a conventional single phase meter or the more expensive rotating standard) to govern the indicators 31; through the three synchronous motors, it is within the scope of the invention to use three regular single phase meters, one for each of the synchronous motors.

Further the invention is not limited to the particular way shown for setting up a series of electrical impulses to amplifier 19. The Figure 1 of the drawing is a schematic perspective of the parts heretofore described and in Figure 2 I have shown a modified arrangement for picking up impulses from the rotating disc of a meter, (whether it be the disc of a rotating standard or the disc of a single phase watt hour meter). Here the disc 14a corresponds to disc 14 of unit 10. When the modification of Fig. 2 is employed a set of leads 32 will be connected to amplifier 19 one going to a ground and the other to fixed plate 33. Disc 14a is provided with projections 15a. Plate 33 is provided with similar projections 34. Plate 33 is mounted directly underneath disc 14 so that both plate and disc are in parallel horizontal planes with the smallest possible vertical separation which will give the necessary mechanical clearance as disc 14a rotates.

Disc 14a is normally grounded through the upper bearing on its supporting shaft. The plate and disc combination consequently form the two plates of a condenser whose capacity periodically varies as the teeth 15a pass over teeth 34, the capacity being a maximum when the two sets of teeth are at their closest approach and a minimum when one set of teeth is centered on the blank spaces between the other set of teeth.

A high frequency voltage, on the order of several megacycles, is generated within amplifier 19 and is impressed upon plate 33. As a result, condenser current will flow in leads 32 and this current will be amplitude modulated by the periodic fluctuations in the condenser circuit as disc 14a rotates. The resultant current, within amplifier 19, is rectified, detected and amplified exactly as in any AM radio so that the alternating current which is then fed to motor 20 shall have the same frequency as the cyclic variations in capacity of the condenser arrangement above described.

It is to be understood that the invention is not limited to the precise construction set forth but that it includes within its purview whatever changes fairly come within either the terms or the spirit of the appended claims.

What I claim is:

1. Apparatus of the character described comprising means to set up a series of electrical impulses under the influence of the movement of a rotating part of a standard test meter, means for amplifying said impulses to develop an electrical current of sufficient strength to drive a synchronous motor, said motor having a rotating output member, a dial, a rotative indicator driven from such output member operative over said dial and chain speed gearing between the output member and the indicator for varying the effect of said member upon the indicator in accordance with the varying characteristics of meters to be compared with said standard test meter.

2. A structure as recited in claim 1 in combination with a meter to be tested and means under control of the latter meter for interrupting the movement of the said indicator after the meter being tested has completed a determined number of revolutions.

3. A structure as recited in claim 1 in combination with a meter to be tested, an electrically actuated coupling member included in the connections between the output member of the synchronous motor and the indicator, and means under control of the meter being tested for actuating said coupling member to stop the indicator, after the meter being tested has made a determined number of revolutions.

4. In a meter testing assembly, a rotating standard test meter having a horizontally rotating disc, said disc having a row of openings around its circumference, a light source and a photoelectric cell positioned so that a beam of light from the light source will pass through the successive openings of the disk and impose a succession of light impulses upon the photoelectric cell, an amplifier for amplifying the electrical impulses set up by the photoelectric cell, a synchronous motor and connections from the amplifier to said synchronous motor, said motor having an output shaft which is driven in unison with the disc of the rotating standard, a movable indicator for indicating the rotations of the standard and connections between the output shaft of the synchronous motor and the indicator which connections comprise a pair of adjustable change speed gearings, the adjustment of one of which compensates for varying $K_H$ characteristics of meters being tested and the adjustment of the other of which so changes the indication of the indicator with respect to the actual rotations of the standard as to render it possible to test the elements of polyphase meters.

5. In a meter testing assembly, a rotating standard test meter having a horizontally rotating disc, said disc having a row of openings around its circumference, a light source and a photoelectric cell positioned so that a beam of light from the light source will pass through the successive openings of the disc and impose a succession of light impulses upon the photoelectric cell, an amplifier for amplifying the electrical impulses set up by the photoelectric cell, a synchronous motor and connections from the amplifier to said synchronous motor, said motor having an output shaft which is driven in unison with the disc of the rotating standard, a movable indicator for indicating the rotations of the standard and connections between the output shaft of the synchronous motor and the indicator which connections comprise a pair of adjustable change speed gearings, the adjustment of one of which compensates for varying $K_H$ characteristics of meters being tested and the adjustment of the other of which so changes the indication of the indicator with respect to the actual rotations of the standard as to render it possible to test the elements of polyphase meters, a meter to be tested, a photoelectric counter actuated by said last named meter and means under control of said counter for disconnecting the indicator and the output element of the synchronous motor upon completion of a determined number of revolutions of said counter.

6. Apparatus of the character described comprising means to set up a series of electrical impulses under the influence of the movement of a rotating part of a standard test meter, means for amplifying said impulses to develop an electrical current of sufficient strength to drive a synchronous motor, said motor having a rotating output member, an indicator driven from such output member and change speed gearing between the output member and the indicator for varying the effect of said member upon the indicator in accordance with the varying characteristics of meters to be compared with said standard test meter, a meter to be tested, a counter photoelectrically controlled from said meter, means controlled by said counter for disconnecting the synchronous motor and the indicator upon the completion of a determined number of revolutions of the meter under test, additional synchronous motors actuated by current delivered under control of the rotating element of a standard test meter, and means under control of said counter for successively connecting said synchronous motors to the said current whereby said additional synchronous motors are rendered available for testing additional meters, or additional characteristics of the same meters all through the use of but one rotating standard.

7. Apparatus of the character described comprising means to set up a series of electrical impulses under the influence of the movement of a rotating part of a standard test meter, means for amplifying said impulses to develop an electrical current of sufficient strength to drive a synchronous motor, said motor having a rotating output member, a movable indicator driven from such output member, change speed gearing between the output member and the indicator for varying the effect of said member upon the indicator in accordance with the varying characteristics of meters to be compared with said standard test meter, and a graduated element with which the indicator coacts to register thereon the degree of movement of the pointer.

RUDOLF A. K. FLEISCHMANN.

REFERENCES CITED

The following references are of record in the file of this patent:

UNITED STATES PATENTS

| Number | Name | Date |
|---|---|---|
| 1,819,494 | Aronoff | Aug. 18, 1931 |
| 1,857,593 | Hill | May 10, 1932 |